Patented May 31, 1949

2,471,583

UNITED STATES PATENT OFFICE 2,471,583

STABILIZATION OF NITROCELLULOSE

Richard E. Reeves, New Orleans, La., and Joel E. Giddens, Washington, Ga., assignors to the United States of America as represented by the Secretary of Agriculture No Drawing. Application May 16, 1946, Serial No. 670,086

3 Claims. (Cl. 260—223)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a continuation in part of our copending application for patent, Serial No. 534,370, filed May 5, 1944, granted as Patent No. 2,404,887.

This invention relates to nitrated cellulose, and has for its primary objects an improvement in the process of stabilizing such cellulose, and such other objects as will be apparent in consideration of the following specification:

Due to the use of sulfuric acid in the preparation of nitrocellulose, it is ordinarily necessary to remove the retained sulfate to stabilize the product. This is conventionally accomplished by repeated boiling in water and beating treatments, a long and tedious process. It is also known that addition of a little ammonia to the boiling water aids in stabilization. However, in this event it is necessary to control the amount of ammonia added very closely, as the addition of ammonia little beyond slight alkalinity deleteriously affects the nitrocellulose.

According to the invention described and claimed in Patent No. 2,404,887, ammonia is used at a lower temperature, preferably room temperature, as one treatment, in which event the alkalinity need not be so carefully controlled. According to the invention claimed herein, ammonium salts are used instead of the hydroxide, the treating solution being buffered to remain slightly acidic. In this event excess salt can be used with a hot solution with no deleterious effect on the nitrocellulose, and thus be introduced in connection with a boiling treatment.

Ammonium salts which yield ammonium ions in the aqueous solution may be used. Ammonium sulfate is preferred, although such salts as ammonium chloride and ammonium carbonate appear to be equally effective.

The following examples exhibit the invention in greater detail:

EXAMPLE I

Cotton fibers, cut to about 0.15 inch and purified to meet the specifications for linters to be used in the production of "pyro" nitrocellulose by the Naval Powder Factory, were dried overnight at 105° C. A 32 g. portion of the dried fiber was stirred in a solution consisting of 234 g. of $H_2O$, 866 g. of $H_2SO_4$, and 494 g. of $HNO_3$, all chemicals used being of C. P. or reagent grade. The mixture was maintained at 40° C. for 20 minutes, immediately after which the formed nitrocellulose was filtered and drowned in cold tap water.

The nitrocellulose thus prepared was rinsed free of superficial nitrating acids and divided into portions which were subjected to boiling for one hour in various buffered solutions with or without added ammonium sulfate. The composition of the solutions, the amount of added ammonium sulfate, the pH at the beginning and end of the boiling treatment and the stability of the treated samples are indicated in Table 1, the "110° test" described in the above-mentioned patent being used. In the table, the pH's of portions 1 and 2 were adjusted with acetic acid, of portions 3 and 4 with citric acid, of portions 5, 6, 7, 8 and 9 with sodium hydroxide, and of portions 10 and 11 with hydrochloric acid. Inspection of this table shows that when the buffered solutions were employed without added ammonium sulfate, very poor stability was obtained. With ammonium sulfate added to the buffered solutions, excellent stability was obtained in the pH range of 4.0 to 5.5.

Table 1

| Portion | Cellulose nitrate boiled one hour with the following 1% solutions, rinsed, and dried | Ammonium sulfate added g./100 ml. | pH at 25° C. Beginning | pH at 25° C. End | Stability 110° test min. |
|---|---|---|---|---|---|
| 1 | Sodium acetate | None | 5.5 | 5.5 | 3 |
| 2 | do | 0.10 | 5.5 | 5.4 | 50 |
| 3 | Potassium citrate | None | 5.5 | 5.5 | 3 |
| 4 | do | 0.10 | 5.5 | 5.4 | 40 |
| 5 | Potassium acid phthalate | None | 5.5 | 5.4 | 3 |
| 6 | do | 0.10 | 5.5 | 5.5 | 35, 28 |
| 7 | do | 0.10 | 5.0 | 5.0 | 28, 36 |
| 8 | do | 0.10 | 4.5 | 4.5 | 32, 35 |
| 9 | do | 0.10 | 4.0 | 4.0 | 21, 18 |
| 10 | do | 0.10 | 3.5 | 3.55 | 18 |
| 11 | do | 0.10 | 3.0 | 3.07 | 10 |

EXAMPLE II

Although the stabilization of nitrocellulose with faintly acid solutions containing ammonium salts is greatly accelerated at elevated temperatures, the following example exhibits a similar effect on allowing the solutions to act for longer periods of time at ordinary temperatures. Nitrocellulose prepared as in Example I was given a one-hour boil in distilled water, rinsed and placed in a solution containing approximately 0.5 percent ammonium acetate buffered to an initial pH of 5.0. Samples were withdrawn, after various intervals of time, rinsed and dried. In Table 2, item 1, is shown the duration of the treatment and the 110° stability which was produced in the sample. It is apparent that under these conditions good stability was realized in approximately 24 hours. Also shown in Table 2, item 2, are the results of a similar experiment employing 0.5 percent sodium acetate buffered at an initial pH of 5.0. In this instance, no improved stability was observed even in 82 days, illustrating that the ammonium cannot be replaced by sodium ions.

*Table 2*

| Item | Reagent | Duration of treatment | Stability 110° test min. |
|---|---|---|---|
| 1 | Ammonium acetate | 1 min | 3, 3 |
|   |   | 10 min | 3, 3 |
|   |   | 1 hour | 3, 4 |
|   |   | 5 hours | 8 |
|   |   | 24 hours | 26, 35 |
|   |   | 4 days | 40, 45 |
|   |   | 7 days | 18, 22 |
|   |   | 82 days | 60 |
| 2 | Sodium acetate | 1 min |  |
|   |   | 10 min |  |
|   |   | 1 hour |  |
|   |   | 5 hours | 4, 5 |
|   |   | 24 hours | 4 |
|   |   | 4 days | 3 |
|   |   | 82 days | 4 |

Having thus described the invention, what is claimed is:

1. The process of stabilizing nitrocellulose comprising boiling nitrocellulose with an aqueous solution containing an ammonium salt which yields ammonium ions in the solution, said solution being buffered to maintain a pH of about 4 to 5.5.

2. The process of stabilizing nitrocellulose comprising boiling nitrocellulose with an aqueous solution containing ammonium sulfate, said solution being buffered to maintain a pH of about 4 to 5.5.

3. The process of stabilizing nitrocellulose comprising treating nitrocellulose with an acid aqueous solution containing an ammonium salt which yields ammonium ions in the solution, said solution being buffered to maintain a pH higher than 4.

RICHARD E. REEVES.
JOEL E. GIDDENS.

REFERENCES CITED

The following references are of record in the file of this patent:

UNITED STATES PATENTS

| Number | Name | Date |
|---|---|---|
| 1,633,292 | Shipley | Jun. 21, 1927 |
| 1,873,061 | Snelling et al. | Aug. 23, 1932 |
| 1,912,399 | Norton | June 6, 1933 |
| 1,995,117 | Eskew | Mar. 19, 1935 |